United States Patent
Noh

(10) Patent No.: US 10,080,269 B2
(45) Date of Patent: Sep. 18, 2018

(54) MASK ASSEMBLY FABRICATION APPARATUS AND MASK ASSEMBLY FABRICATION METHOD USING THE SAME

(71) Applicant: Samsung Display Co., Ltd., Yongin-si, Gyeonggi-do (KR)

(72) Inventor: Hee-Seak Noh, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 101 days.

(21) Appl. No.: 15/186,802

(22) Filed: Jun. 20, 2016

(65) Prior Publication Data

US 2016/0295660 A1    Oct. 6, 2016

Related U.S. Application Data

(62) Division of application No. 14/034,901, filed on Sep. 24, 2013, now Pat. No. 9,526,146.

(30) Foreign Application Priority Data

Apr. 19, 2013 (KR) .................. 10-2013-0043648

(51) Int. Cl.
H05B 33/10 (2006.01)
B23P 19/04 (2006.01)

(52) U.S. Cl.
CPC .............. H05B 33/10 (2013.01); B23P 19/04 (2013.01); *Y10T 29/49826* (2015.01); *Y10T 29/5177* (2015.01); *Y10T 29/53261* (2015.01); *Y10T 29/53265* (2015.01); *Y10T 29/53961* (2015.01); *Y10T 29/53974* (2015.01); *Y10T 29/53978* (2015.01)

(58) Field of Classification Search
CPC ... H05B 33/10; B23P 19/04; Y10T 29/53265; Y10T 29/53978; Y10T 29/53961; Y10T 29/53261; Y10T 29/5177; Y10T 29/53974; Y10T 29/49826
See application file for complete search history.

(56) References Cited

U.S. PATENT DOCUMENTS

| | | | |
|---|---|---|---|
| 5,939,852 A | 8/1999 | Akutsu | |
| 6,252,234 B1 | 6/2001 | Hazelton | |
| 2004/0151556 A1 | 8/2004 | Ferrari | |

FOREIGN PATENT DOCUMENTS

| | | |
|---|---|---|
| JP | 06234204 | 8/1994 |
| KR | 10-2006-0135307 | 12/2006 |
| KR | 10-2007-0080432 | 8/2007 |
| KR | 10-2011-0072440 | 6/2011 |

*Primary Examiner* — John C Hong
(74) *Attorney, Agent, or Firm* — Lewis Roca Rothgerber Christie LLP

(57) ABSTRACT

A mask assembly fabrication apparatus includes a first vibration proof apparatus formed on a base surface, a first surface plate formed on the first vibration proof apparatus, stages formed on the first surface plate, a mask frame placed on the stages, a second vibration proof apparatus formed on the base surface to be separate from the first vibration proof apparatus, a second surface plate formed on the second vibration proof apparatus to be separate from the first surface plate, and a driving unit formed on the second surface plate and configured to move a mask.

20 Claims, 14 Drawing Sheets

MASK ASSEMBLY FABRICATION APPARATUS AND MASK ASSEMBLY FABRICATION METHOD USING THE SAME

CROSS-REFERENCE TO RELATED APPLICATIONS

This application is a divisional of U.S. application Ser. No. 14/034,901, filed on Sep. 24, 2013, which claims priority to Korean Patent Application No. 10-2013-0043648 filed on Apr. 19, 2013 in the Korean Intellectual Property Office, the disclosures of which are incorporated herein by reference in their entireties.

BACKGROUND

Field

The present disclosure relates to a mask assembly fabrication apparatus and a mask assembly fabricating method using the same.

Description of the Related Technology

Due to recent developments in the field of displays, conventional cathode ray tubes (CRTs) are being replaced by a variety of thinner, lighter, and more energy-conserving flat panel displays.

Typical flat panel displays include a liquid crystal display (LCD), a plasma display panel (PDP), a field emission display (FED) and an organic electroluminescence device.

Among the flat panel displays, the organic electroluminescence device has been receiving attention as a next-generation display because of its wide viewing angle, high contrast ratio, and fast response speed.

The organic electroluminescence device includes a light-emitting layer, which is interposed between first and second electrodes that face each other, and an intermediate layer, which includes the light-emitting layer. The first and second electrodes and the intermediate layer may be formed in various manners including an independent deposition method. To form an organic electroluminescence device, a fine metal mask (FMM) having a predetermined pattern is firmly attached onto a substrate, and an organic layer having the predetermined pattern is formed by depositing the material thereof on the substrate. The FMM is formed as an assembly obtained by assembling a mask into a mask frame. During the fabrication of the assembly, the driving force for transferring the mask often generates vibration. Such vibration may lead to minor assembly error, and may thus eventually result in a defective product.

SUMMARY OF CERTAIN INVENTIVE ASPECTS

Aspects of the present invention provide a mask assembly fabrication apparatus and a mask assembly fabrication method using the same.

Aspects of the present invention are not restricted to the ones set forth herein. Other aspects of the present invention will become more apparent to one of ordinary skill in the art to which the present invention pertains by referencing the detailed description of the present invention given below.

According to an aspect of the present invention, there is provided a mask assembly fabrication apparatus, comprising a first dustproof apparatus formed on a base surface, a first surface plate formed on the first dustproof apparatus, at least one stage formed on the first surface plate, a mask frame placed on the at least one stage, a second dustproof apparatus formed on the base surface and separate from the first dustproof apparatus, a second surface plate formed on the second dustproof apparatus and separate from the first surface plate, and a driving unit formed on the second surface plate and moves a mask.

According to another aspect of the present invention, there is provided a mask assembly fabrication apparatus, comprising a dustproof apparatus formed on a base surface, a surface plate formed on the dustproof apparatus, stages formed on the surface plate, a mask frame placed on the stages, a first direction rail formed on the base surface, separate from the dustproof apparatus and the surface plate, and a driving unit formed on the first direction rail and configured to move a mask.

According to still another aspect of the present invention, there is provided a mask assembly fabrication method, comprising placing a mask frame on stages, where the stages are formed on a first dustproof apparatus via a first surface plate, causing a mask carrying unit, connected to a driving unit separate from the first surface plate and the first dustproof apparatus, to pick up a mask, causing the driving unit to move the mask carrying unit over the mask frame, and assembling the mask to the mask frame.

It is possible to prevent the deformation of a mask assembly and the degradation of the quality of a product from occurring due to vibration generated by a driving unit, by providing the driving unit and a surface plate for supporting stages to be separate from each other. Accordingly, it is possible to increase the operating speed and the operating efficiency of a mask assembly fabrication apparatus.

The effects of the present invention are not restricted to the ones set forth herein. The above and other effects of the present invention will become more apparent to one of daily skill in the art to which the present invention pertains by referencing the claims.

BRIEF DESCRIPTION OF THE DRAWINGS

The above and other aspects and features of the present invention will become more apparent by describing certain embodiments thereof with reference to the attached drawings, in which.

DETAILED DESCRIPTION OF CERTAIN INVENTIVE EMBODIMENTS

Figure 1:
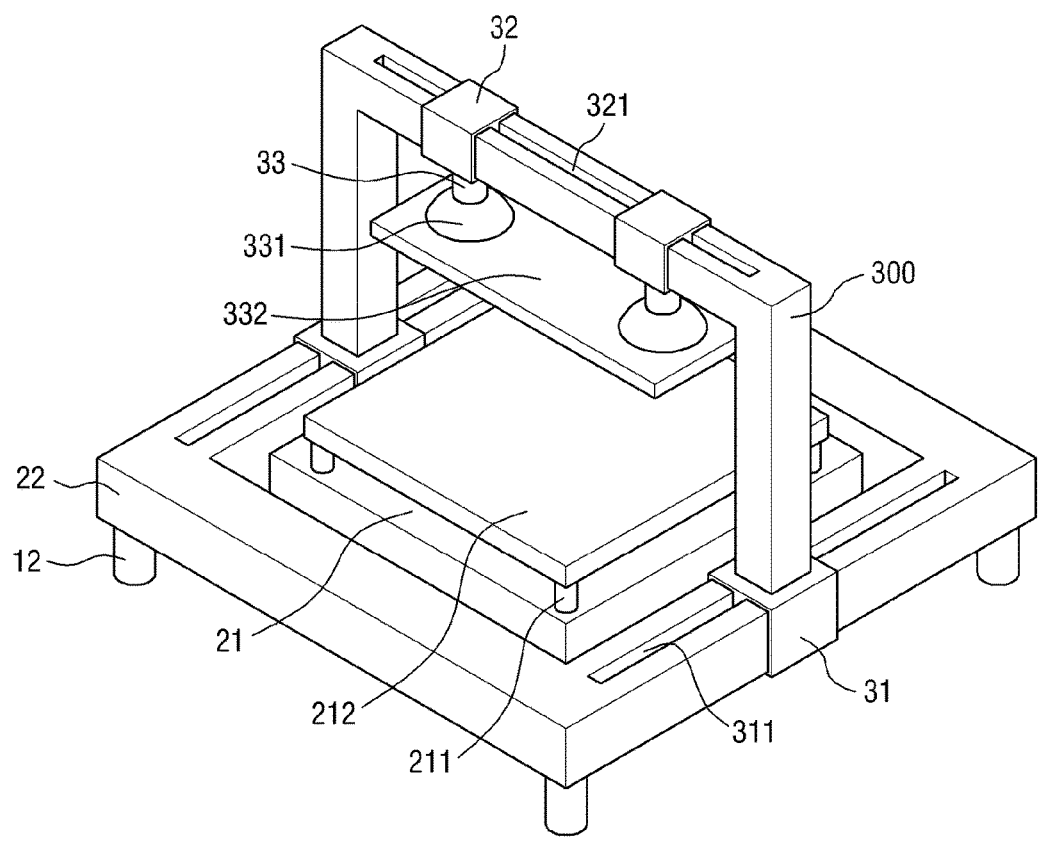
FIG. 1 is a schematic perspective view illustrating a mask assembly fabrication apparatus according to an embodiment of the present invention.

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are provided to assist those of ordinary skill in the art in a comprehensive understanding of the invention, and the present invention is only defined within the scope of the appended claims.

The term "on" is used to designate that an element is on another element or located on a different layer or a layer, and includes both a case where an element is located directly on another element or a layer, and a case where an element is located on another element via another layer or still another element. In the entire description of the present invention, the same drawing reference numerals are generally used for the same elements across various figures.

Although the terms "first, second," and so forth are used to describe diverse constituent elements, such constituent elements are not limited by the terms. The terms are used only to discriminate a constituent element from other constituent elements. Accordingly, in the following description, a first constituent element may be a second constituent element.

A mask assembly fabrication apparatus according to an embodiment of the present invention will hereinafter be described with reference to FIGS. 1 through 3.

FIG. 1 is a schematic perspective view illustrating a mask assembly fabrication apparatus according to an embodiment of the present invention. FIG. 2 is a schematic vertical cross-sectional view illustrating the embodiment of a mask assembly fabrication apparatus illustrated in FIG. 1. FIG. 3 is a schematic plan view illustrating the embodiment of a mask assembly fabrication apparatus illustrated in FIG. 1.

Figure 2:
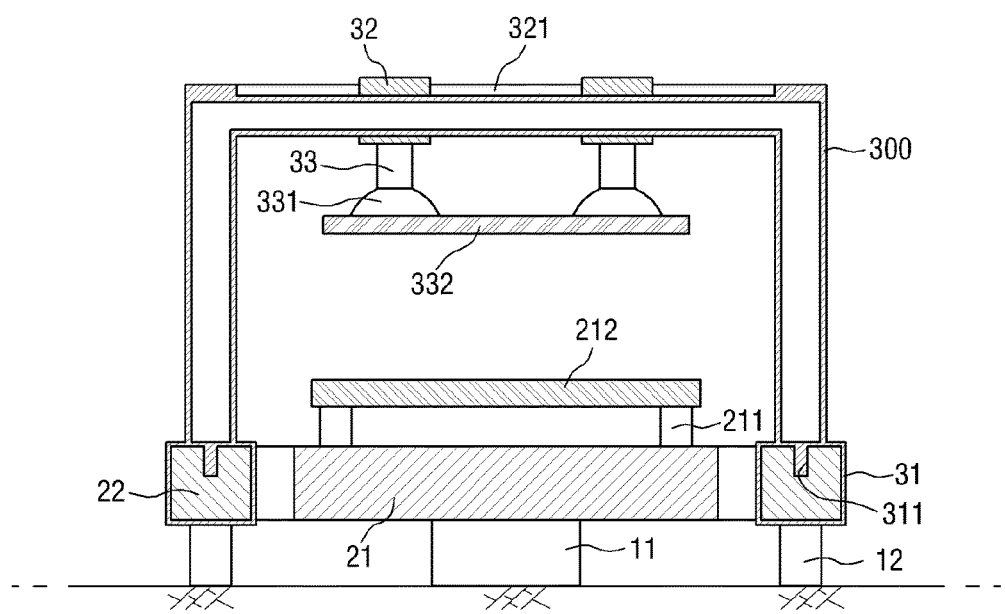
FIG. 2 is a schematic vertical cross-sectional view illustrating the mask assembly fabrication apparatus illustrated in FIG. 1.
Figure 3:
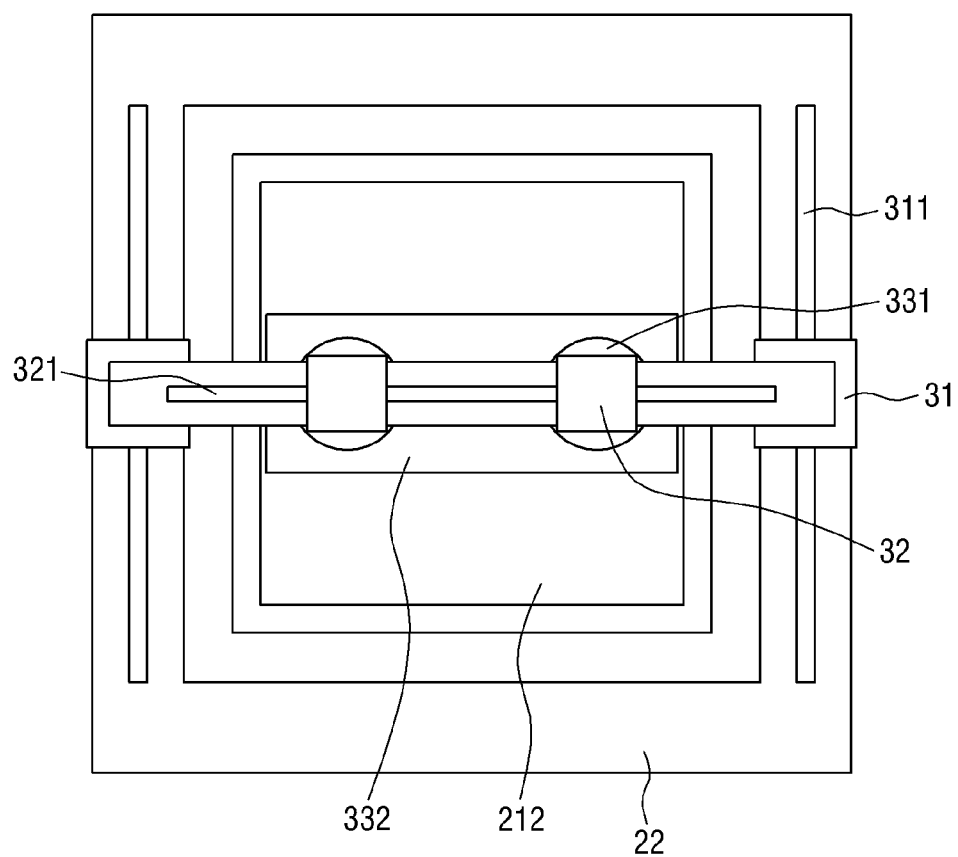
FIG. 3 is a schematic plan view illustrating the mask assembly fabrication apparatus illustrated in FIG. 1.

Referring to FIGS. 1 through 3, the mask assembly fabrication apparatus includes a first dustproof apparatus 11, which is formed on a base surface, a first surface plate 21, which is formed on the first dustproof apparatus 11, stages 211, which are formed on the first surface plate 21 and on which a mask frame 212 is placed, a second dustproof apparatus 12, which is formed on the base surface to be separate from the first dustproof apparatus 11, a second surface plate 22, which is formed on the second dustproof apparatus 12 separately from the first surface plate 21, and a driving unit, which is formed on the second surface plate 22 and moves a mask 332.

The first dustproof apparatus 11 and the second dustproof apparatus 12 separately support the first surface plate 21 and the second surface plate 22, respectively, over the base surface. The first dustproof apparatus 11 and the second dustproof apparatus 12 prevent any vibration from the base surface from being transmitted to the first surface plate 21 and the second surface plate 22.

A mask assembly having the same pattern as an organic layer to be formed, such as a fine metal mask (FMM), generally has a fine structure. Accordingly, even a small amount of vibration during the fabrication of such mask assembly may result in defective pixels in a product. The first dustproof apparatus 11 and the second dustproof apparatus 12 can suppress external vibration.

The term "surface plate", as used herein, indicates, but is not limited to, a rigid block or table having a smoothly polished flat surface and formed of stone, cast iron, and the like.

A related-art mask assembly fabrication apparatus in which stages and a driving unit are formed together on a single surface plate can prevent vibration from a base surface by means of a dustproof apparatus, but may be susceptible to vibration from the driving unit during the operation of the driving unit. Accordingly, the related-art mask assembly fabrication apparatus cannot increase the operating speed of the driving unit to minimize the vibration of the driving unit, and as a result, the operating efficiency of the related-art mask assembly fabrication apparatus decreases.

The mask assembly fabrication apparatus according to the embodiment illustrated in FIGS. 1 through 3 has a structure in which the first surface plate 21 and the second surface plate 22 are separately supported by the first dustproof apparatus 11 and the second dustproof apparatus 12, respectively, and support the stages 211 and the driving unit separately. Accordingly, vibration generated by the driving unit cannot reach the first surface plate 21 including the stages 211 on which the mask frame 212 is placed. Therefore, the overall operating speed of the mask assembly fabrication apparatus illustrated in FIGS. 1 to 3 can be improved by increasing the operating speed of the driving unit with no effects from vibration.

In an example, the driving unit may include first direction driving portions 31, second direction driving portions 32, third direction driving portions 33 and a driving unit gantry 300. The orientations of the first direction driving portions 31, the second direction driving portions 32, and the third direction driving portions 33 may be perpendicular to one another.

The first direction driving portions 31 move in a first direction on the second surface plate 22. There is no restriction on the manner in which the first direction driving portions 31 move on the second surface plate 22. In an example, first direction rails 311 may be formed on the second surface plate 22 for the movement of the first direction driving portions 31 in the first direction, and the first direction driving portions 31 may be configured to move along the first direction rails 311. The first direction rails 311 are illustrated in FIGS. 1 through 3 as being formed on the top surface of the second surface plate 22. In an alternative example, the first direction rails 311 may be formed to be apart from the second surface plate 22. In this example, the mask assembly fabrication apparatus may also include a support unit which fixes the first direction rails 311 onto the second surface plate 22. One or more first direction driving portions 31 may be provided on each side of the first surface plate 21, the stages 211 and the mask frame 212.

The first direction driving portions 31 are connected to the driving unit gantry 300. The driving unit gantry 300 includes a Y-axis portion which is connected to the first direction driving units 31 and an X-axis portion which is disposed apart from the stages 211 and extends in a second direction. The second direction driving portions 32 are connected to the X-axis portion of the driving unit gantry 300. There is no restriction on the manner in which the second direction driving portions 32 move along the X-axis portion. In an example, second direction rails 321 may be formed on the X-axis portion for the movement of the second direction driving portions 32 in the second direction, and the second direction driving portions 32 may be configured to move along the second direction rails 321.

The third direction driving portions 33 are respectively connected to the second direction driving portions 32. Mask carrying units 331 for carrying the mask 332 are respectively connected to the third direction driving portions 33. Examples of the mask carrying units 331 may include, but are not limited to, jigs, clamps, vacuum pickups, and the like. Various other tools than those set forth herein may be used as the mask carrying units 331 as long as they can properly carry the mask 332.

Figure 4:
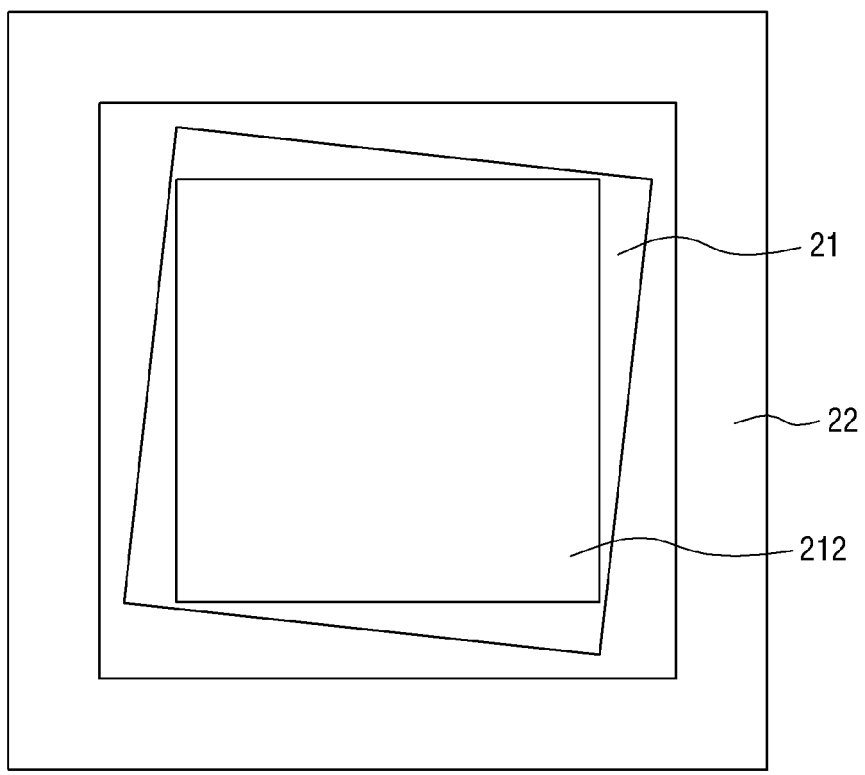
FIG. 4 is a schematic plan view illustrating a surface plate and stages of the mask assembly fabrication apparatus illustrated in FIG. 1, according to an embodiment of the present invention.
Figure 5:
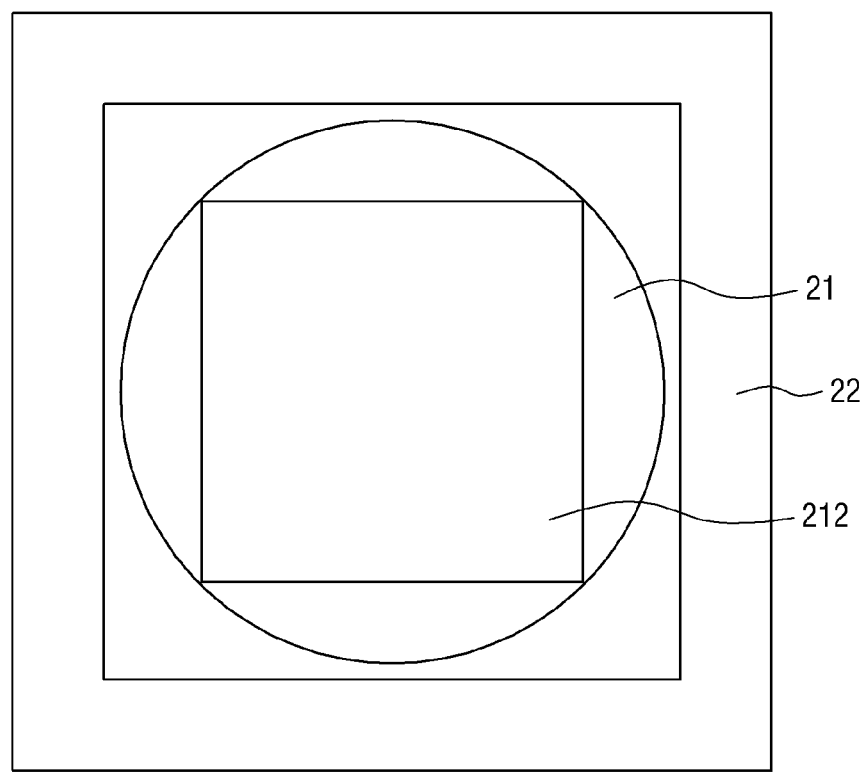
FIG. 5 is a schematic plan view illustrating a surface plate and stages of the mask assembly fabrication apparatus illustrated in FIG. 1, according to another embodiment of the present invention.
Figure 6:
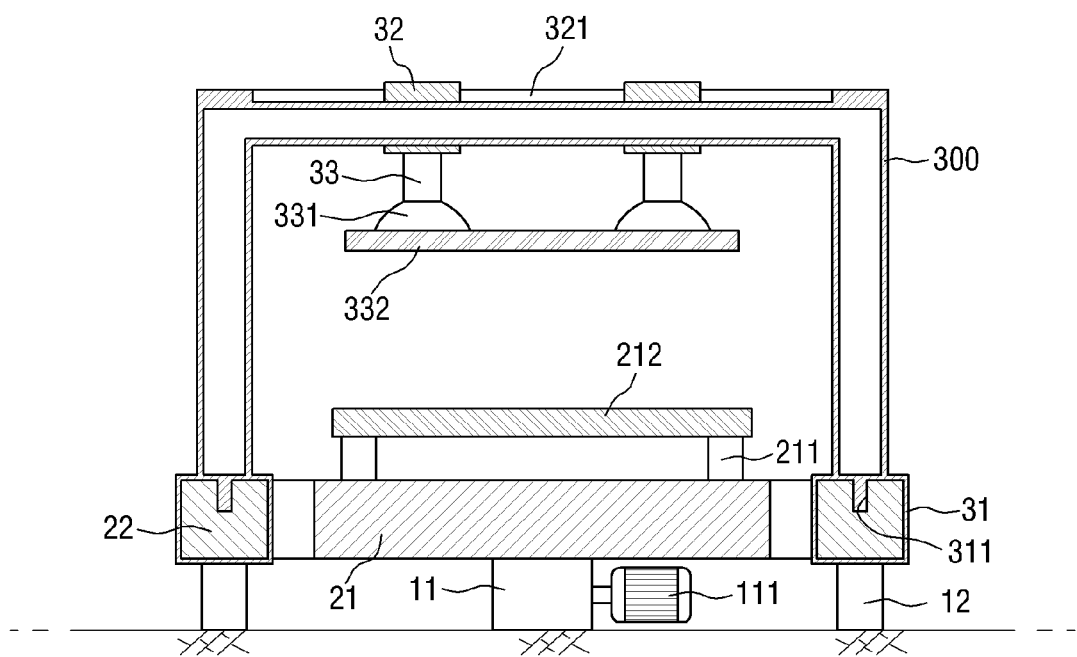
FIG. 6 is a schematic vertical cross-sectional view illustrating the mask assembly fabrication apparatus illustrated in FIG. 4 or 5.

FIG. 4 is a schematic plan view illustrating a surface plate and stages of the embodiment of a mask assembly fabrication apparatus illustrated in FIG. 1, according to an embodiment of the present invention. FIG. 5 is a schematic plan view illustrating a surface plate and stages of the mask assembly fabrication apparatus illustrated in FIG. 1, according to another embodiment of the present invention. FIG. 6 is a schematic vertical cross-sectional view illustrating the mask assembly fabrication apparatus illustrated in FIG. 4 or 5.

Referring to FIGS. 4 through 6, the mask assembly fabrication apparatus includes the first dustproof apparatus 11, which is formed on a base surface, the first surface plate 21, which is formed on the first dustproof apparatus 11, the stages 211, which are formed on the first surface plate 21 and on which the mask frame 212 is placed, the second dustproof apparatus 12, which is formed on the base surface to be separate from the first dustproof apparatus 11, the second surface plate 22, which is formed on the second dustproof apparatus 12 and is separate from the first surface plate 21, the driving unit, which is formed on the second surface plate 22 and moves the mask 332, and a motor 111, which rotates the first surface plate 21.

When viewed from above, the first surface plate 21 is surrounded by the second surface plate 22. If the mask 332 is assembled to the mask frame 212 when the mask frame 212 is misaligned with the second surface plate 22, a defect may occur. To prevent this, the first surface plate 21 may be rotated so as for the mask frame 212 to be aligned with the second surface plate 22.

There is no restriction on the planar shape of the first surface plate 21. In an example, the first surface plate 21 may be rectangular. In this example, a determination may be made as to whether the mask frame 212 is misaligned with the first surface plate 21 by comparing the sides of the mask frame 212 with the sides of the first surface plate 21. In another example, the first surface plate 21 may be circular. In this example, the first surface plate 21 can be effectively rotated with not many restrictions, and thus, the position of the mask frame 212 can be actively corrected.

In an example, the motor 111 may be separate from the first dustproof apparatus 11, and may rotate the first surface plate 21 via the first dustproof apparatus 11. In another example, the motor 111 may be embedded in the first dustproof apparatus 11, and may rotate the first surface plate 21. However, the manner in which the motor 111 rotates the first surface plate 21 is not limited to those set forth herein. That is, the motor 111 may rotate the first surface plate 21 using various methods that are already available or modifications thereof.

A mask assembly fabrication apparatus according to another embodiment will hereinafter be described with reference to FIGS. 7 through 9.

Figure 7:
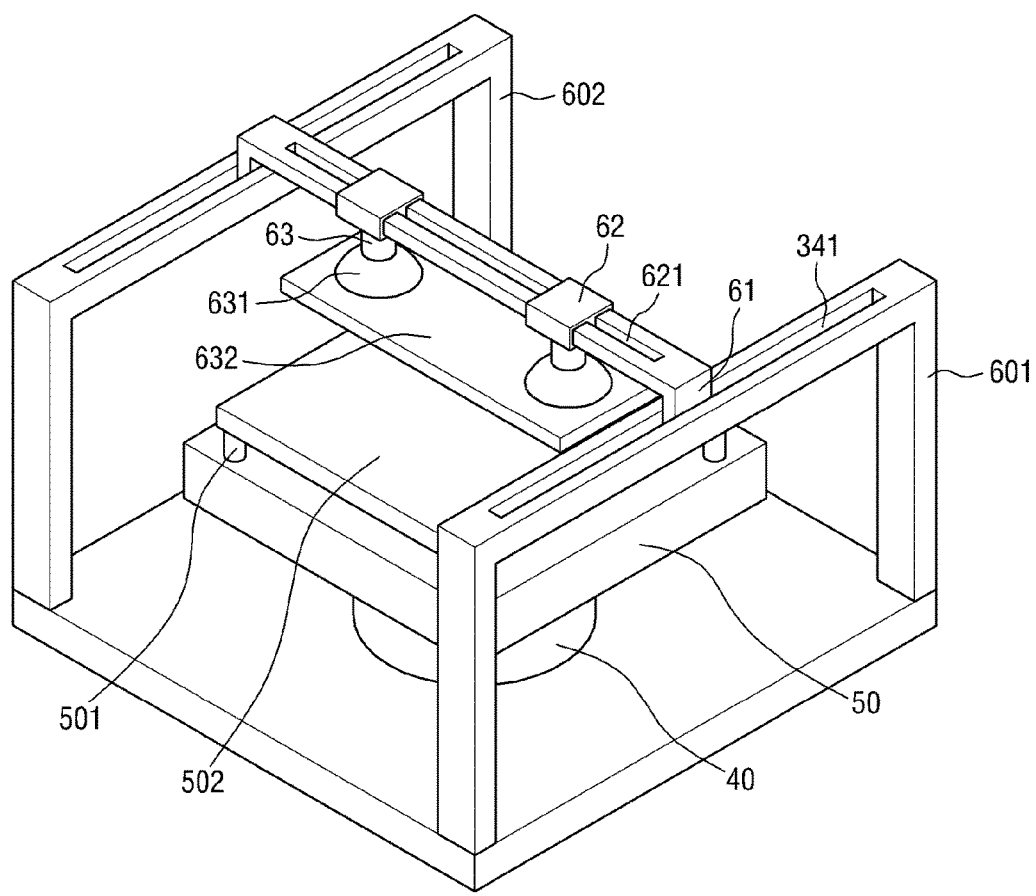
FIG. 7 is a schematic perspective view illustrating a mask assembly fabrication apparatus according to another embodiment of the present invention.

FIG. 7 is a schematic perspective view illustrating a mask assembly fabrication apparatus according to another embodiment of the present invention. FIG. 8 is a schematic vertical cross-sectional view illustrating the mask assembly fabrication apparatus illustrated in FIG. 7. FIG. 9 is a schematic plan view illustrating the mask assembly fabrication apparatus illustrated in FIG. 7.

Figure 8:
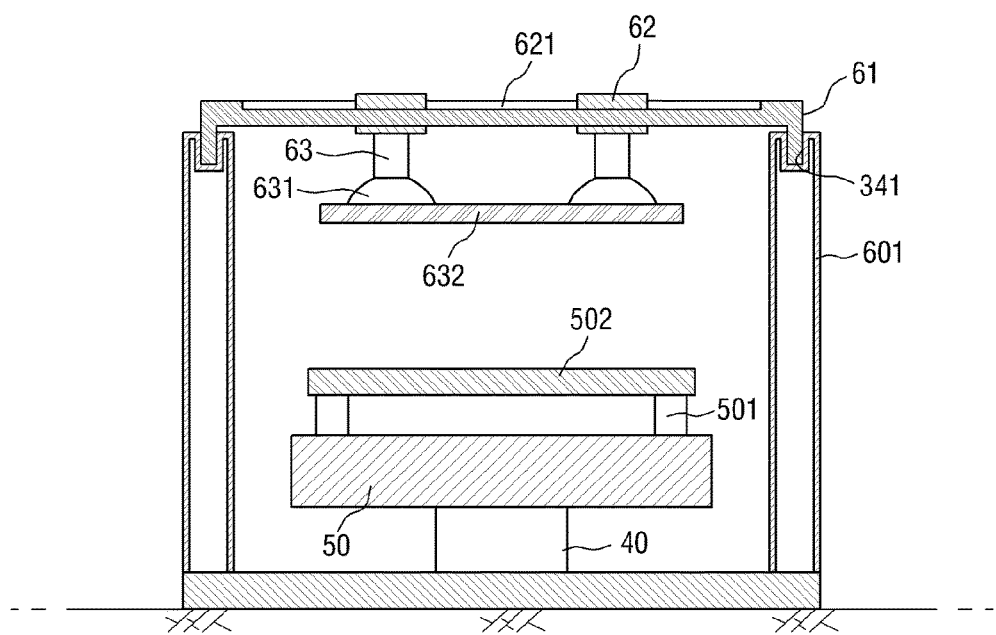
FIG. 8 is a schematic vertical cross-sectional view illustrating the embodiment of a mask assembly fabrication apparatus illustrated in FIG. 7.
Figure 9:
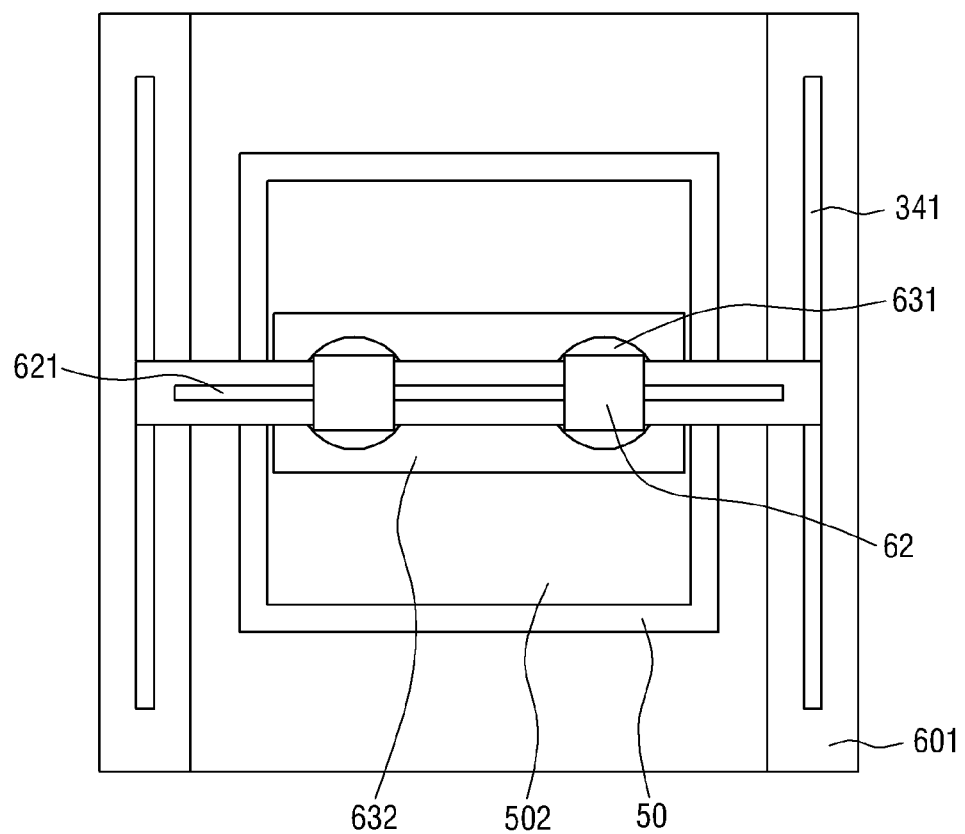
FIG. 9 is a schematic plan view illustrating the embodiment of a mask assembly fabrication apparatus illustrated in FIG. 7.

Referring to FIGS. 7 through 9, the mask assembly fabrication apparatus includes a dustproof apparatus 40, which is formed on a base surface, a surface plate 50, which is formed on the dustproof apparatus 40, stages 501, which are formed on the surface plate 50 and on which a mask frame 502 is placed, first direction rails 601 and 602, which are formed on the base surface to be separate from the dustproof apparatus 40 and the surface plate 50, and a driving unit which is formed on the first direction rails 601 and 602 and moves a mask 632.

The dustproof apparatus 40 supports the surface plate 50 over the base surface. The dustproof apparatus 40 prevents any vibration from the base surface from being transmitted to the surface plate 50.

In the mask assembly fabrication apparatus illustrated in FIGS. 7 to 9, the stages 501 and the driving unit are separate. That is, vibration generated by the driving unit cannot be transmitted to the surface plate 50 including the stages 501 on which the mask frame 502 is placed. Accordingly, the operating speed of the driving unit can be increased with no effects from vibration, and thus, the overall operating speed of the mask assembly fabrication apparatus illustrated in FIGS. 7 through 9 can be improved.

In an example, the driving unit may include a first direction driving portion 61, second direction driving portions 62 and third direction driving portions 63. The orientations of the first direction driving portion 61, the second direction driving portions 62 and the third direction driving portions 63 may be perpendicular to one another.

The first direction driving portion 61 moves in a first direction over the base surface. There is no restriction on the manner in which the first direction driving portion 61 moves over the base surface. In an example, the first direction rails 601 and 602 may be formed over the base surface for the movement of the first direction driving portion 61 in the first direction, and the first direction driving portion 61 may be configured to move along the first direction rails 601 and 602. The first direction rails 601 and 602 are illustrated in FIGS. 7 to 9 as being apart from the base surface and including support portions that are formed between and thus connect the first rails 601 and 602 and the base surface so as to connect the first rails 601 and 602 and the base surface. In an alternative example, a first direction rail 341 may be formed on the base surface, and a driving unit gantry to which the first direction driving portion 61 may be connected may be provided, as illustrated in FIGS. 1 to 3. One or more first direction driving portions 61 may be provided on each side of the surface plate 50, the stages 501 and the mask frame 502.

In an example, the first direction rails 601 and 602 may be connected to the base surface via a dustproof apparatus (not shown), which is separate from the dustproof apparatus 40. In this example, vibration from the base surface is removed.

The first direction driving portion 61 includes an axis portion which is connected to the first direction rails 601 and 602, is disposed apart from the stages 501, and extends in the second direction. The second direction driving portions 62 may be connected to the axis portion. There is no restriction on the manner in which the second direction driving portions 62 move along the axis portion. In an example, a second direction rail 621 may be formed on the axis portion for the movement of the second direction driving portions 62 in the second direction, and the second direction driving portions 62 may be configured to move along the second direction rail 621.

The third direction driving portions 63 are respectively connected to the second direction driving portions 62, and a mask carrying unit 631 for carrying the mask 632 is connected to the third direction driving portions 63. Examples of the mask carrying units 631 may include, but are not limited to, jigs, clamps, vacuum pickups, and the like. Various other tools than those set forth herein may be used as the mask carrying units 631 as long as they can properly carry the mask 632.

Figure 10:
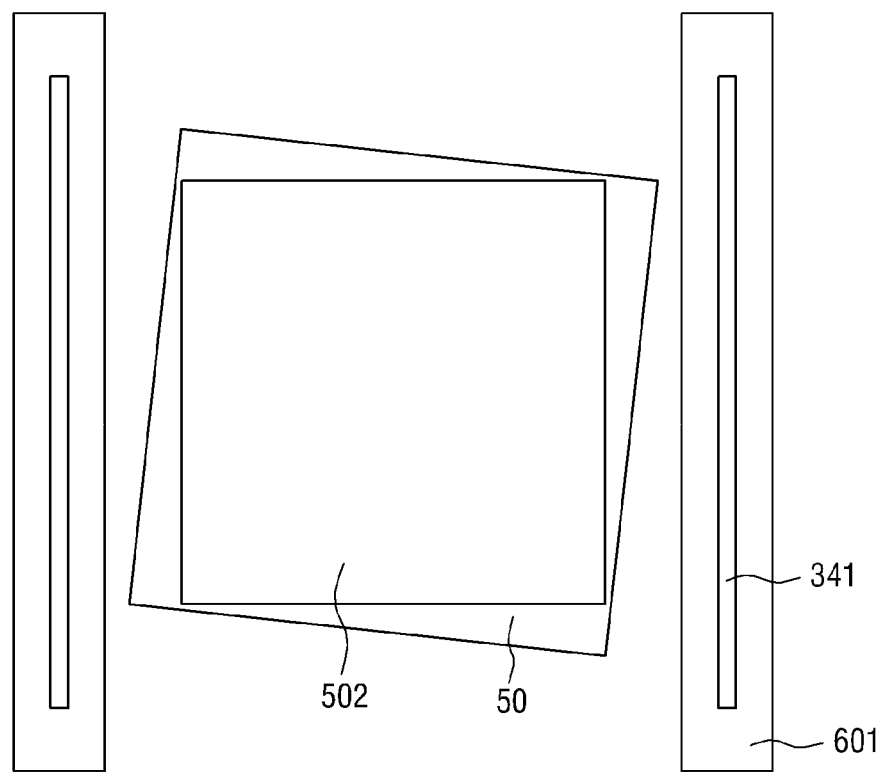
FIG. 10 is a schematic plan view illustrating a surface plate, stages and first direction rails of the embodiment of a mask assembly fabrication apparatus illustrated in FIG. 7, according to an embodiment of the present invention.
Figure 11:
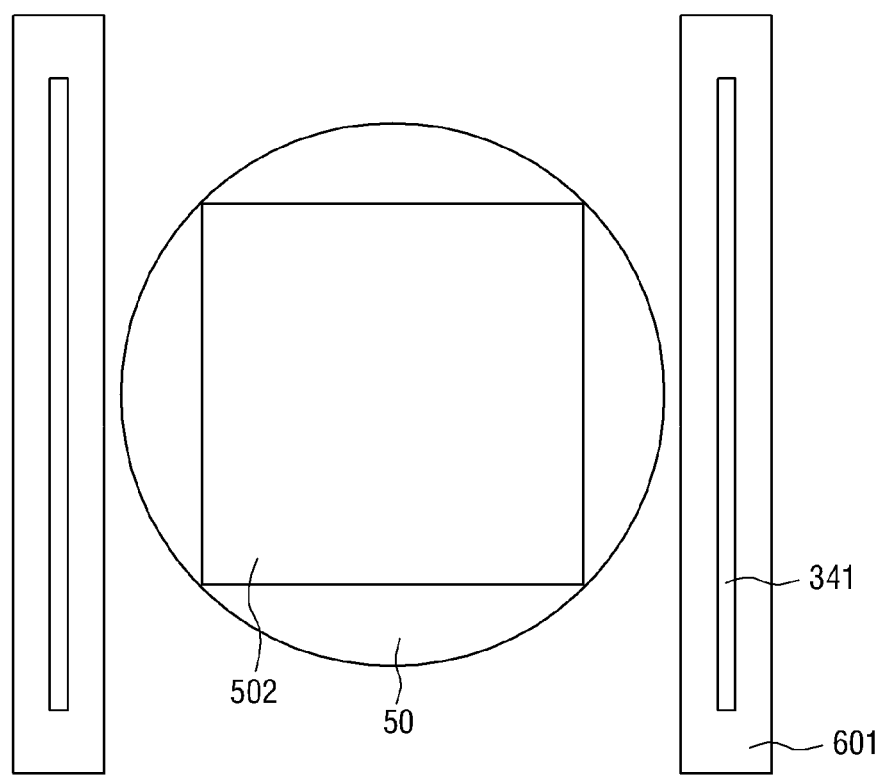
FIG. 11 is a schematic plan view illustrating a surface plate, stages and first direction rails of the embodiment of a mask assembly fabrication apparatus illustrated in FIG. 7, according to another embodiment of the present invention.
Figure 12:
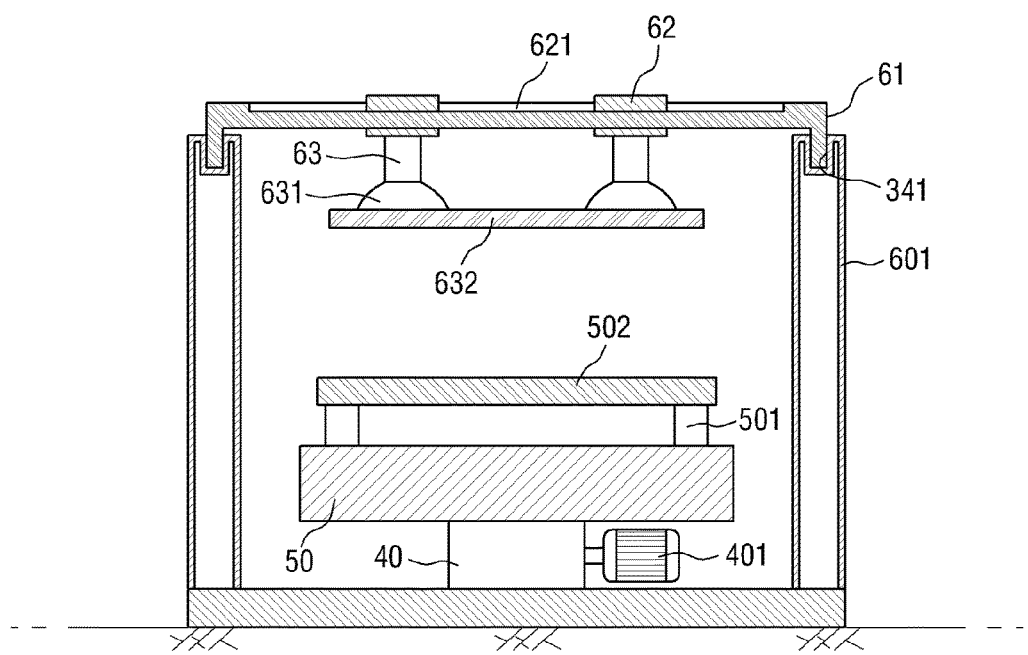
FIG. 12 is a schematic vertical cross-sectional view illustrating the embodiment of a mask assembly fabrication apparatus illustrated in FIG. 10 or 11.

FIG. 10 is a schematic plan view illustrating a surface plate, stages and first direction rails of the embodiment of a mask assembly fabrication apparatus illustrated in FIG. 7, according to an embodiment of the present invention. FIG. 11 is a schematic plan view illustrating a surface plate, stages and first direction rails of the embodiment of a mask assembly fabrication apparatus illustrated in FIG. 7, according to another embodiment of the present invention. FIG. 12 is a schematic vertical cross-sectional view illustrating the mask assembly fabrication apparatus illustrated in FIG. 10 or 11.

Referring to FIGS. 10 through 12, the mask assembly fabrication apparatus includes the dustproof apparatus 40, which is formed on the base surface, the surface plate 50, which is formed on the dustproof apparatus 40, the stages 501, which are formed on the surface plate 50 and on which the mask frame 502 is placed, the first and second direction rails 601 and 602, which are formed on the base surface to be separate from the dustproof apparatus 40 and the surface plate 50, the driving unit, which is formed on the first direction rail units 601 and 602 and moves the mask 632, and a motor 401, which rotates the surface plate 50.

When viewed from above, the surface plate 50 is located between the first direction rails 601 and 602. If the mask 632 is assembled to the mask frame 502 when the mask frame 502 is misaligned with the first direction rails 601 and 602, a defect may occur. To prevent this, the surface plate 50 may be rotated so as for the mask frame 502 to be aligned with the first direction rails 601 and 602.

There is no restriction on the planar shape of the surface plate 50. In an example, the surface plate 50 may be rectangular. In this example, a determination may be made as to whether the mask frame 502 is misaligned with the surface plate 50 by comparing the sides of the mask frame 502 with the sides of the surface plate 50. In another example, the surface plate 50 may be circular. In this example, the surface plate 50 can be effectively rotated with not many restrictions, and thus, the position of the mask frame 502 can be actively corrected.

In an example, the motor 401 may be separate from the dustproof apparatus 40, and may rotate the surface plate 50 via the dustproof apparatus 40. In another example, the motor 401 may be embedded in the dustproof apparatus 40, and may rotate the surface plate 50. However, the manner in which the motor 401 rotates the surface plate 50 is not limited to those set forth herein. That is, the motor 401 may rotate the surface plate 50 using various methods that are already available or modifications thereof.

Mask assembly fabrication methods according to embodiments of the present invention will hereinafter be described with reference to FIGS. 13 and 14.

Figure 13:
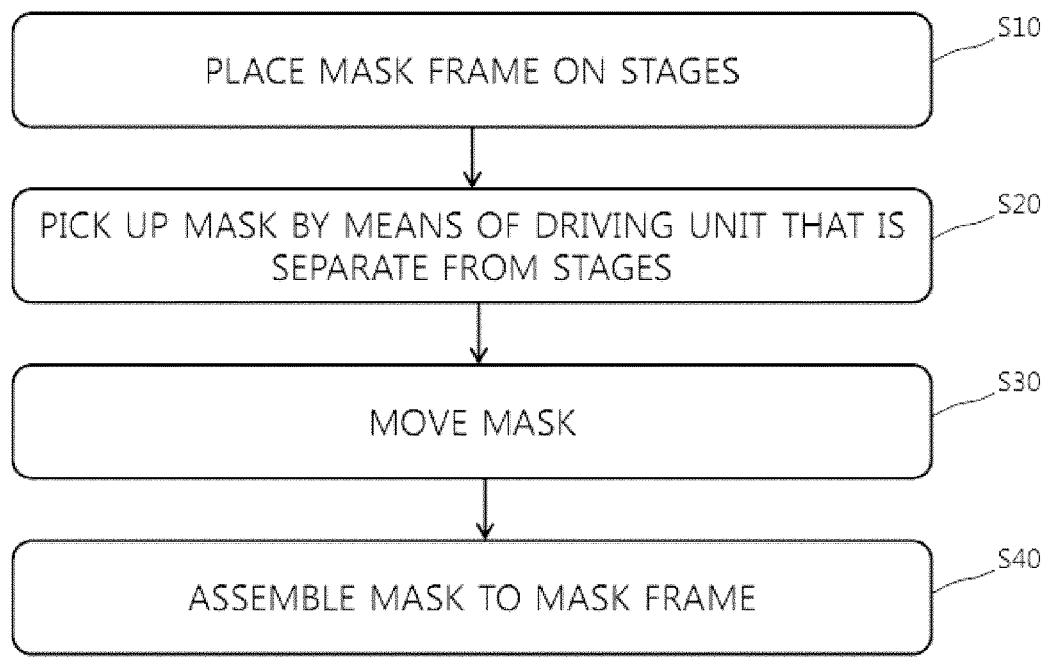
FIG. 13 is a schematic flowchart illustrating a mask assembly fabrication method according to an embodiment of the present invention.

FIG. 13 is a schematic flowchart illustrating a mask assembly fabrication method according to an embodiment of the present invention.

As illustrated in FIGS. 1 through 3 and 13, the mask assembly fabrication method includes: placing the mask frame 212 (operation S10) on the stages 211, which are formed on the first dustproof apparatus 11 via the first surface plate 21; allowing the mask carrying unit 331, which is connected to the driving unit that is separate from the first surface plate 21 and the first dustproof apparatus 11, to pick up the mask 332 (operation S20); allowing the driving unit to move the mask carrying unit 331 over the mask frame 212 (operation S30); and assembling the mask 332 to the mask frame 212 (operation S40).

The driving unit is located over the second surface plate 22 and the second dustproof apparatus 12, which are separate from the first surface plate 11 and the first dustproof apparatus 11, and thus prevents any vibration generated during the operation of the mask carrying unit 331 from being transmitted to the stages 211 and the mask frame 212.

Jigs, clamps, vacuum pickups, and the like, may be used as the mask carrying unit 331 to pick up and/or carry the mask 332.

Figure 14:
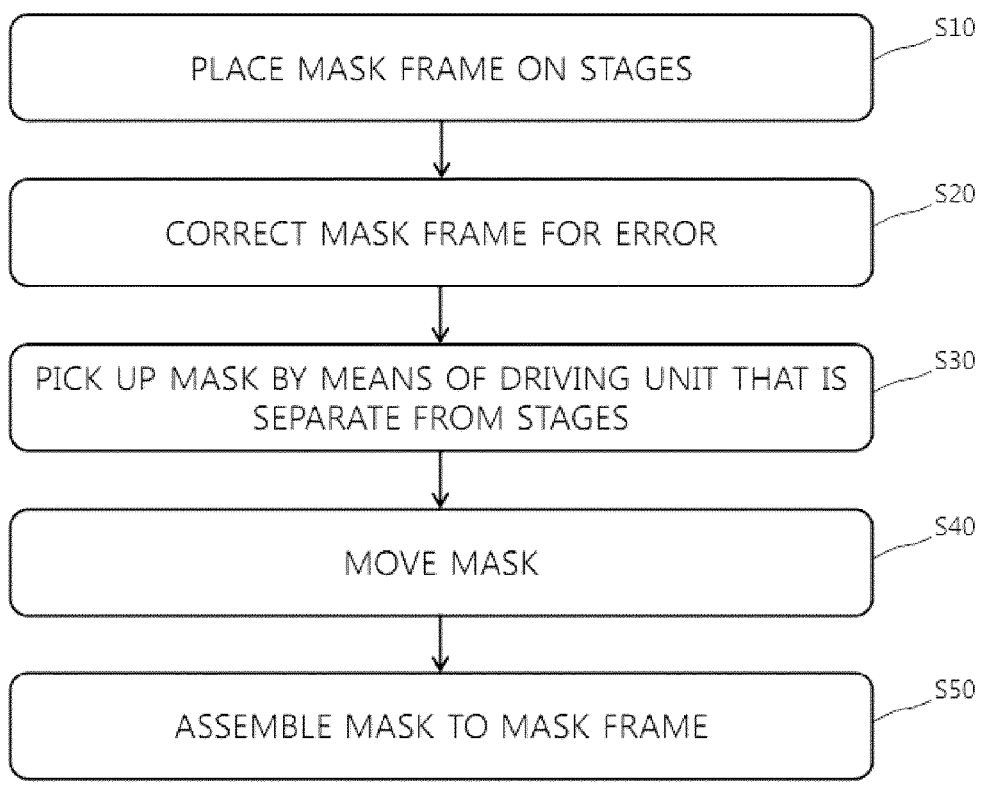
FIG. 14 is a schematic flowchart illustrating a mask assembly fabrication method according to another embodiment of the present invention.

FIG. 14 is a schematic flowchart illustrating a mask assembly fabrication method according to another embodiment of the present invention.

Referring to FIGS. 1 through 6 and 14, the mask assembly fabrication method includes: placing the mask frame 212 (operation S10) over the stages 211, which are formed on the first dustproof apparatus 11 via the first surface plate 21; selectively correcting the mask frame 212 for any rotation error (operation S20); allowing the mask carrying unit 331, which is connected to the driving unit that is separate from the first surface plate 21 and the first dustproof apparatus 11, to pick up the mask 332 (operation S30); allowing the driving unit to move the mask carrying unit 331 over the mask frame 212 (operation S40); and assembling the mask 332 to the mask frame 212 (operation S50).

The mask 332 has a very fine pattern formed thereon and is thus highly susceptible to even a minute error. In response to there being any rotation error in the mask frame 212, i.e., in response to the mask frame 212 being misaligned, the mask 332 may not be able to be precisely assembled to the mask frame 212 and may thus cause a defect.

To prevent this, the first surface plate 21 may be horizontally rotated so as to correct the mask frame 212 for any rotation error. In an example, the motor 111 may be separate from the first dustproof apparatus 11, and may rotate the first surface plate 21 via the first dustproof apparatus 11. In another example, the motor 111 may be embedded in the first dustproof apparatus 11, and may rotate the first surface plate 21. However, the manner in which the motor 111 rotates the first surface plate 21 is not limited to those set forth herein.

That is, the motor 111 may rotate the first surface plate 21 using various methods that are already available or modifications thereof.

The above-described embodiments are exemplary and applicable in combinations.

Although certain embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A mask assembly fabrication method comprising:
    placing a mask frame on stages which are formed on a first vibration proof apparatus via a first surface plate;
    causing a mask carrying unit, connected to a driving unit separate from the first surface plate and the first vibration proof apparatus, to pick up a mask;
    causing the driving unit to move the mask carrying unit over the mask frame; and
    assembling the mask to the mask frame,
    wherein the driving unit is not connected to the first surface plate and the mask frame.

2. The mask assembly fabrication method of claim 1, wherein the driving unit comprises a first direction driving portion, a second direction driving portion, a third direction driving portion and a driving unit gantry, and is formed on a first direction rail disposed on a base surface, separately from the first surface plate and the first vibration proof apparatus.

3. The mask assembly fabrication method of claim 2, wherein the mask carrying unit is configured to carry the mask through the third direction driving portion.

4. The mask assembly fabrication method of claim 2, wherein the first direction rail is formed near the base surface.

5. The mask assembly fabrication method of claim 2, wherein the first direction rail is formed apart from the base surface.

6. The mask assembly fabrication method of claim 5, wherein the driving unit comprises a support unit configured to fix the first direction rail onto the base surface.

7. The mask assembly fabrication method of claim 6, wherein the support unit is fixed onto the base surface via the first vibration proof apparatus.

8. The mask assembly fabrication method of claim 2, wherein the first direction driving unit comprises an axis portion which is connected to the first direction rail, is disposed apart from the stages and extends in a second direction.

9. The mask assembly fabrication method of claim 8, wherein the second direction driving portion is connected to the first direction driving portion.

10. The mask assembly fabrication method of claim 9, wherein the first direction driving unit comprises a second direction rail.

11. The mask assembly fabrication method of claim 1, further comprising, after placing the mask frame on the stages, selectively correcting the mask frame for any rotation error.

12. The mask assembly fabrication method of claim 11, wherein the selectively correcting the mask frame for any rotation error comprises horizontally rotating the first surface plate using a motor connected to the first surface plate.

13. The mask assembly fabrication method of claim 1, wherein in the placing the mask frame on the stages, the mask carrying unit comprises a second vibration proof apparatus formed on the base surface and separate from the first vibration proof apparatus, and a second surface plate formed on the second vibration proof apparatus and separate from the first surface plate, the driving unit being formed on the second surface plate to move the mask.

14. The mask assembly fabrication method of claim 13, wherein the driving unit comprises a first direction driving portion, a second direction driving portion, a third direction driving portion and a driving unit gantry, and a rail for movement in a first direction is formed on the second surface plate.

15. The mask assembly fabrication method of claim 14, wherein the rail is formed on a surface of the second surface plate.

16. The mask assembly fabrication method of claim 14, wherein the rail is formed apart from the second surface plate.

17. The mask assembly fabrication method of claim 14, wherein the mask carrying unit comprises a support unit configured to fix the rail onto the second surface plate.

18. The mask assembly fabrication method of claim 14, wherein the driving unit gantry comprises a Y-axis portion connected to the first direction driving portion and an X-axis portion disposed apart from the stages and extending in a second direction.

19. The mask assembly fabrication method of claim 14, wherein the second direction driving portion is connected to the X-axis portion of the driving unit gantry.

20. The mask assembly fabrication method of claim 14, wherein the X-axis portion of the driving unit gantry comprises a second direction rail for movement in a second direction.

* * * * *